(12) United States Patent
Otanez et al.

(10) Patent No.: US 8,447,508 B2
(45) Date of Patent: May 21, 2013

(54) STOCHASTIC DETECTION OF TORQUE CONVERTER SLIP SPEED AND RELATED CONTROL

(75) Inventors: Paul G. Otanez, Troy, MI (US); Chunhao J. Lee, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 497 days.

(21) Appl. No.: 12/651,529

(22) Filed: Jan. 4, 2010

(65) Prior Publication Data

US 2011/0166758 A1    Jul. 7, 2011

(51) Int. Cl.
G06G 7/78    (2006.01)

(52) U.S. Cl.
USPC ........... 701/301; 477/175; 477/176; 477/169; 477/64; 477/62; 701/51; 475/118; 192/103 R; 192/3.29; 192/3.3

(58) Field of Classification Search
USPC .............. 701/55, 60, 67–68, 51, 301; 477/54, 477/78, 171, 175–176, 64, 169; 192/3.28, 192/103 R, 3.3; 475/118
See application file for complete search history.

(56) References Cited

U.S. PATENT DOCUMENTS

| | | | | |
|---|---|---|---|---|
| 4,724,939 A | * | 2/1988 | Lockhart et al. | 192/3.3 |
| 4,785,923 A | * | 11/1988 | Ushijima | 192/3.3 |
| 5,305,663 A | * | 4/1994 | Leonard et al. | 475/123 |
| 5,413,539 A | * | 5/1995 | Leonard et al. | 475/63 |
| 5,626,536 A | * | 5/1997 | Kono et al. | 477/181 |
| 5,627,750 A | * | 5/1997 | Kono et al. | 701/67 |
| 6,565,483 B2 | * | 5/2003 | Segawa et al. | 477/174 |
| 7,302,330 B1 | * | 11/2007 | Holtz et al. | 701/51 |
| 7,366,601 B2 | * | 4/2008 | Ayabe et al. | 701/51 |
| 7,769,518 B2 | * | 8/2010 | Segawa et al. | 701/68 |
| 7,931,561 B2 | * | 4/2011 | Otanez et al. | 477/176 |
| 8,010,265 B2 | * | 8/2011 | Samie et al. | 701/55 |
| 8,332,109 B2 | | 12/2012 | Otanez et al. | |
| 2002/0077218 A1 | * | 6/2002 | Segawa et al. | 477/176 |
| 2002/0091477 A1 | * | 7/2002 | Hagiwara et al. | 701/67 |
| 2004/0092362 A1 | * | 5/2004 | Ayabe et al. | 477/62 |
| 2005/0177295 A1 | * | 8/2005 | Rodrigues et al. | 701/67 |
| 2009/0149298 A1 | | 6/2009 | Otanez et al. | |
| 2009/0150032 A1 | * | 6/2009 | Samie et al. | 701/51 |
| 2011/0060509 A1 | * | 3/2011 | Otanez et al. | 701/58 |
| 2011/0166758 A1 | * | 7/2011 | Otanez et al. | 701/67 |
| 2012/0296536 A1 | | 11/2012 | Lee et al. | |

FOREIGN PATENT DOCUMENTS

| | | | |
|---|---|---|---|
| JP | 61-121439 | * | 5/1986 |
| JP | 6-191989 | * | 7/1994 |
| JP | 2002-326828 | * | 11/2002 |

OTHER PUBLICATIONS

Simulation of Clutch Slipping Control of Automatic Transmission; Qian Lijun; Yang Nianjiong; Wu Daojun; Intelligent Human-Machine Systems and Cybernetics (IHMSC), 2010 2nd International Conference on; vol. 1; Digital Object Identifier: 10.1109/IHMSC.2010.65; Publication Year: 2010 , pp. 235-238.*

(Continued)

Primary Examiner — Cuong H Nguyen (57) ABSTRACT

A method for controlling torque converter slip includes operating the torque converter in a controlled slip mode, monitoring slip in the torque converter, statistically analyzing the monitored slip to determine a likely condition of the torque converter, and utilizing the likely condition of the torque converter to control the torque converter slip.

19 Claims, 8 Drawing Sheets

OTHER PUBLICATIONS

H∞ control design for torque-converter-clutch slip system; Hibino, R.; Osawa, M.; Yamada, H.; Kono, K.; Tanaka, M.; Decision and Control, 1996., Proceedings of the 35th IEEE; vol. 2; Digital Object Identifier: 10.1109/CDC.1996.572828 Publication Year: 1996 , pp. 1797-1802 vol. 2.*

Slip control for a lock-up clutch with a robust control method; Adachi, K.; Ochi, Y.; Segawa, S.; Higashimata, A.;SICE 2004 Annual Conference; vol. 1; Publication Year: 2004 , pp. 744-749 vol. 1.*

Engagement control for automotive dry clutch; Glielmo, L.; Vasca, F.; American Control Conference, 2000. Proceedings of the 2000; vol. 2; Digital Object Identifier: 10.1109/ACC.2000.876654; Publication Year: 2000 , pp. 1016-1017 vol. 2.*

Torque fill-in for an automated shift manual transmission in a parallel hybrid electric vehicle; Baraszu, R.C.; Cikanek, S.R. American Control Conference, 2002. Proceedings of the 2002; vol. 2; Digital Object Identifier: 10.1109/ACC.2002.1023222 Publication Year: 2002 , pp. 1431-1436 vol. 2.*

H∞ control design for torque-converter-clutch slip system; Hibino, R.; Osawa, M.; Yamada, H.; Kono, K.; Tanaka, M.;Decision and Control, 1996., Proceedings of the 35th IEEE; vol. 2; Digital Object Identifier: 10.1109/CDC.1996.572828 Publication Year: 1996 , pp. 1797-1802 vol. 2.*

Development of a neural network based virtual sensor for automatic transmission slip; Ting, T.L.; Intelligent Control, 2002. Proceedings of the 2002 IEEE International Symposium on; Digital Object Identifier: 10.1109/ISIC.2002.1157851 Publication Year: 2002 , pp. 721-727.*

* cited by examiner

FIG. 7B

STOCHASTIC DETECTION OF TORQUE CONVERTER SLIP SPEED AND RELATED CONTROL

TECHNICAL FIELD

This disclosure is related to a system and method for controlling the slip in a torque converter of a vehicle.

BACKGROUND

The statements in this section merely provide background information related to the present disclosure and may not constitute prior art.

Internal combustion engine vehicles that employ automatic transmissions typically include a torque converter positioned between the engine and the transmission of the vehicle. A torque converter is a fluid coupling device typically including an impeller coupled to an output shaft of the engine and a turbine coupled to the input shaft of the transmission. The torque converter uses hydraulic fluid to transfer rotational energy from the impeller to the turbine. Thus, the torque converter can disengage the engine crank shaft from the transmission input shaft during vehicle idling conditions to enable the vehicle to stop and/or to shift gears.

The rotational speed of the impeller relative to the turbine in the torque converter is typically different so that there is a converter slip therebetween. Because large slips between the engine output and the transmission input significantly affect the fuel economy of the vehicle, some vehicles employ a torque converter clutch (TCC) for controlling or reducing the slip between the engine and the transmission. The TCC can also mechanically lock the impeller at the output of the engine to the turbine at the input of the transmission so that the engine and transmission rotate at the same speed. Locking the impeller to the turbine is generally only used in limited circumstances because of various implications.

Thus, a TCC generally has three modes. A fully locked mode as just described, a fully released mode and a controlled slip mode. When the TCC is fully released, the slip between the impeller and the turbine of the torque converter is only controlled by the hydraulic fluid therebetween. In the slip mode, the slip between the torque converter impeller and turbine is set so that it does not exceed a predetermine amount by controlling the pressure of the hydraulic fluid in the TCC.

In a torque converter with a TCC in slip mode, changes in conditions affecting the torque converter can cause increases or reductions in slip. For example, a change in engine torque can change the slip in the torque converter before commands to the TCC, including a time lag between the change in slip and reactions in the TCC to control the slip, can control the slip back to a desired or target value. As a result, transitions in the torque converter can generate unintentional changes to the slip. For example, an unintended reduction in slip to a low or zero slip resulting in a torque converter crash can result from an unintended reduction in slip. Crashes cause perceptible changes to the operation of the vehicle or cause drivability issues. Quick and accurate detection of a torque converter crash can be helpful to minimize adverse effects of the crash.

SUMMARY

A powertrain includes an engine, a transmission, and a torque converter located between the engine and the transmission. A method for controlling torque converter slip includes operating the torque converter in a controlled slip mode, monitoring slip in the torque converter, statistically analyzing the monitored slip to determine a likely condition of the torque converter, and utilizing the likely condition of the torque converter to control the torque converter slip.

BRIEF DESCRIPTION OF THE DRAWINGS

One or more embodiments will now be described, by way of example, with reference to the accompanying drawings, in which.

DETAILED DESCRIPTION

Figure 1:
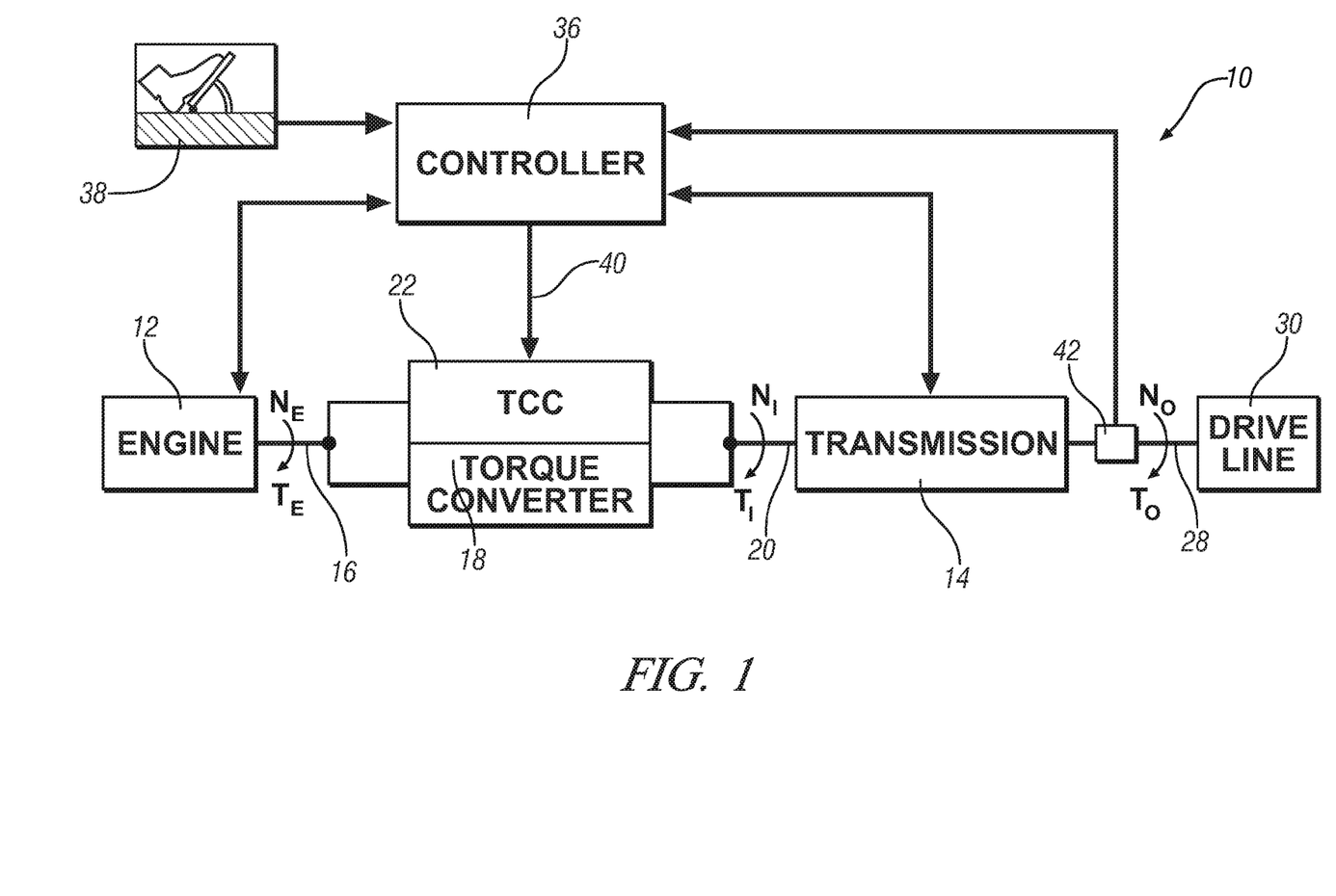
FIG. 1 is a block diagram showing various drive-train components of a vehicle, in accordance with the present disclosure.

Referring now to the drawings, wherein the showings are for the purpose of illustrating certain exemplary embodiments only and not for the purpose of limiting the same, FIG. 1 is a block diagram of various powertrain components of a vehicle 10. The powertrain components include an engine 12 and a transmission 14. An output shaft of the engine 12, represented by line 16, is coupled to one end of a torque converter 18, and an input shaft of the transmission 16, represented by line 20, is coupled to an opposite end of the torque converter 18. As discussed above, the torque converter 18 transfers rotational energy from the engine 12 to the transmission 14 using hydraulic fluid so that the engine 12 can be disengaged from the transmission 14 when necessary. A TCC 22 sets a torque converter slip in the torque converter 18 between the engine 12 and the transmission 14, as discussed above. In this diagram, engine output power is depicted as engine rotational speed ($N_E$) measured in revolutions per minute (RPM) and engine torque ($T_E$) measured in Newton-meters. Likewise, the speed of the transmission 14 at its input is represented by transmission input speed $N_I$ and transmission torque $T_I$. The torque slip in the torque converter 18 is defined as $N_E$ minus $N_I$. An output shaft of the transmission 14, represented as line 28, is coupled to a driveline 30 of the vehicle 10 that distributes the engine power to the vehicle wheels in a manner that is well understood to those skilled in the art. The speed of the output shaft 28 of the transmission 14 is represented as $N_O$ and the torque of the output shaft 28 of the transmission 14 is represented as $T_O$.

The vehicle 10 also includes a controller 36 intended to represent both an engine controller and a transmission controller; however, it will be appreciated that these two controlling functions can be served by a single device or a plurality of communicatively connected devices. The controller 36 receives a throttle position signal from a vehicle throttle 38, and provides control signals to the engine 12 for engine speed and torque related control and signals to the transmission 14 for shift related control. Additionally, depending on the selected engine speed and transmission gear, the controller 36 provides a signal (i.e. a TCC pressure command) on line 40 to the TCC 22 to set the desired torque converter slip. A sensor 42 measures the output behavior of the transmission 14. In one exemplary embodiment, the sensor 42 measures the rotational speed of the output shaft 28 of the transmission 14 and sends a speed signal to the controller 36. Exemplary sensors include an encoder, speed sensor, accelerometer, torque sensor, etc.

The controller 36 may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit (s), input/output circuit(s) and devices, appropriate signal conditioning and buffer circuitry, and other suitable components to provide the described functionality. The controller has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked controllers, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The present disclosure includes methods for adjusting the torque converter slip in response to changes in engine speed and/or transmission gear and/or engine torque so that the slip is at a desired minimum to conserve fuel, but is not in a potential crash condition or not so low where engine pulses and other noise signals are transferred through the torque converter 18 to the driveline 30 and are felt by vehicle occupants. The controller 36 selects the particular slip and transmits a corresponding TCC pressure command to the TCC 22 on line 40 for the current engine speed, transmission gear and engine torque based on a pre-populated table that is stored in the controller 36 as a result of vehicle testing or other operations for a minimum torque converter slip that provides good fuel economy and reduced vibration transfer. One process for populating such a table can be found in U.S. patent application Ser. No. 12/043,499, filed Mar. 6, 2008, commonly assigned to the assignee of the present application, and incorporated herein by reference. If the selected torque converter slip for a particular engine speed, transmission gear and engine torque does not provide the desired slip for preventing vibrations from being transferred to the driveline 30, then the signal from the sensor 42 is used to determine the vibrations in the controller 36, which can then increase the torque converter slip if the vibrations exceed a predetermined threshold.

Torque converter slip can be controlled by application of the TCC. The TCC includes structures mechanically, electronically, or fluidically operated to controllably couple the impeller and turbine of the torque converter, modulating an allowed slip therebetween. When the TCC is fully released, the fluidic coupling of the impeller and the turbine establish slip. When the TCC is fully locked, no slip between the impeller and turbine is possible. In one exemplary control method, the TCC fluid pressure is controlled so that the torque converter slip approaches a desired value. By reducing the pressure of the hydraulic fluid in the TCC, torque converter slip for a given operating condition will increase. Similarly, by increasing the pressure of the hydraulic fluid in the TCC, torque converter slip for a given operating condition will decrease.

As described above, increases in engine speed and/or torque can result in torque slip changing from a controlled value to an excessive value that must be controlled back to a controlled value. Such rapid changes in torque can result from throttle demands by the operator. Similarly, such changes can result from automatically generated commands, for example, in connection with cruise control functions or transmission shifts. Any rapid or sudden change in engine torque includes the potential to create a corresponding increase in torque converter slip. By monitoring engine torque commands or factors indicative of rapid increases in engine torque, methods can be employed to compensate for anticipated increased slip.

A control system can react to rapid increases in torque converter slip by reducing torque converter slip. Methods of feedback control are known in the art that can be used to control slip. Such methods monitor a desired value, control an output according to the desired value, and utilize a resulting value of the controlled output to subsequently improve control to the desired value. Feedback control is known to control slip in a torque converter through variable control of TCC pressure. A desired torque converter slip can be monitored, a TCC pressure command can be modulated in order to control resulting torque converter slip, and the resulting torque converter slip can be used in a feedback loop to subsequently modulate the TCC pressure command. In this way, feedback control can be utilized to control torque converter slip to a desired value. The desired value can be a steady state term, substantially unchanging through a time period, or the desired value can be transitory, for example, increasing or decreasing through a period or changing according to a step profile. Additionally, methods of feed forward control are known, utilizing predictions of control requirements to preemptively issue commands based upon the predictions. Both feedback control and feed forward control can be utilized to react to increases in torque converter slip.

Such an exemplary system can include a pressure control term described by the following equation.

$$\text{TCCpressure command} = \text{feedback\_term} + \text{feed\_forward\_term} \qquad [1]$$

The feed forward term can be based upon many different factors affecting torque applied through the torque converter. In one exemplary embodiment, the feed forward term is based upon engine torque, with the feed forward term increasing with increasing engine torque.

As described above, methods are known to reestablish control over torque converter slip after an unintended change in slip. In addition, a decrease in torque converter slip through known methods to reestablish control over torque converter slip frequently overshoot the desired slip value and drive the torque converter slip to a zero value or crash, resulting in adverse impacts to drivability, as described above. It is known in the art that unexpected changes in slip are caused, for example, by unintended changes in engine torque, vehicle output disturbances (road bumps), and TCC pressure disturbances (pump pressure disturbances).

Methods to reduce or control slip after an increase are contemplated and disclosed herein utilizing feed forward and feedback control. However, these methods rely upon accurate and timely measurements of operation of the powertrain to accurately control the slip. As is known in the art, a number of sources of inaccuracy and interference can disrupt the accurate and timely measurement of the operation. Sources of inaccuracy include factors such as physics of the employed sensor, asynchronicity between the measured engine and turbine speeds, electromagnetic interference, vehicle vibrations, numerical round-errors, and sensor resolution.

Methods of statistical analysis are known to analyze behavior of a system and unknowns acting upon the system and provide probability based descriptions of the system. Statistical methods can be applied to operation of a TCC and utilized to determine a likely crashed condition of the torque converter or a corresponding likely locked condition of the TCC. A method is disclosed to quickly and accurately diagnose a likely condition of the torque converter based upon statistical analysis of the clutch is disclosed such that a crash condition can be recovered from or avoided.

A number of statistical methods of analyzing a TCC are envisioned. For example, a probability that slip at the TCC is zero or below a low slip threshold, indicating the torque converter to be at or near a crashed condition, can be determined. A probability that the TCC is currently locked can be expressed by the following equation.

$$p_k(y_k \mid H_0) = \frac{1}{\sqrt{2\pi} \sqrt{P_{0,k}}} \exp\left[-\frac{1}{2} y_k^T P_{0,k}^T y_k\right] \quad [2]$$

Such a probability can be utilized to diagnose the crashed condition, for example, by comparison to a threshold probability calibrated to accurately diagnose the condition. Similarly to Equation 2, a probability that the TCC is in a slipping condition or is not locked can be expressed by the following equation.

$$p_k(y_k \mid H_1) = \frac{1}{\sqrt{2\pi} \sqrt{P_{1,k}}} \exp\left[-\frac{1}{2} (y_k - y_{ref,k})^T P_{1,k}^{-1} (y_k - y_{ref,k})\right] \quad [3]$$

The value k describes each variable as a measured value at the k sample value in a series of sample values. The value $y_k$ is the measured value of the TCC slip. The subscripts 0 and 1 refer to the system as described by model 0 or 1. The above embodiments of models 0 and 1 describe a locked TCC and a slipping TCC, respectively, but it will be appreciated that different formulas or expressions can similarly be utilized to describe any two conditions being diagnosed in a TCC. $P_{0,k}$ and $P_{1,k}$ represent the system's statistical property named covariance or square of the standard deviation at time k. The variable $y_{ref,k}$ describes the reference slip value at time k, selected as a reference value indicating the slip to be at a slip value indicating or describing the TCC to not be in a locked condition. For example, the reference slip can be set to a desired slip level, or the reference slip can be set to a minimum level indicating a non-crashed condition. One having skill in the art will appreciate that exemplary Equation 2 differs from exemplary Equation 3 by setting $y_{ref,k}$ equal to 0. Different models could be selected with the reference slip values selected to diagnose operation of the system depending upon the particular reference values. $H_0$ and $H_1$ refer to the hypothesis that the system can be described by model 0 or 1, respectively. The probabilities represented can be determined iteratively through a number of samples. Through Equations 2 and 3, probabilities can be determined that describe whether the TCC is locked or not locked. These equations can be compared to each other to describe a likelihood ratio that the clutch is in an unlocked state. Such a likelihood ratio can be expressed by the following equation.

$$\Lambda_k(y_k) = \frac{p_k(y_k \mid H_1)}{p_k(y_k \mid H_0)} \quad [4]$$

In this equation, a ratio of less than one describes a TCC that is more likely to be locked than unlocked, whereas a ratio of greater than one describes a TCC that is more likely to be unlocked than locked. Statistical analysis of the ratio expressed by Equation 4 can be utilized to determine whether it is more likely than not that the torque converter is in a crashed condition. Exemplary methods are disclosed herein for determining whether the torque converter is in a crashed condition, but one having skill in the art will appreciate that a number of known methods are possible to analyze results of the ratio above over time.

Figure 2:
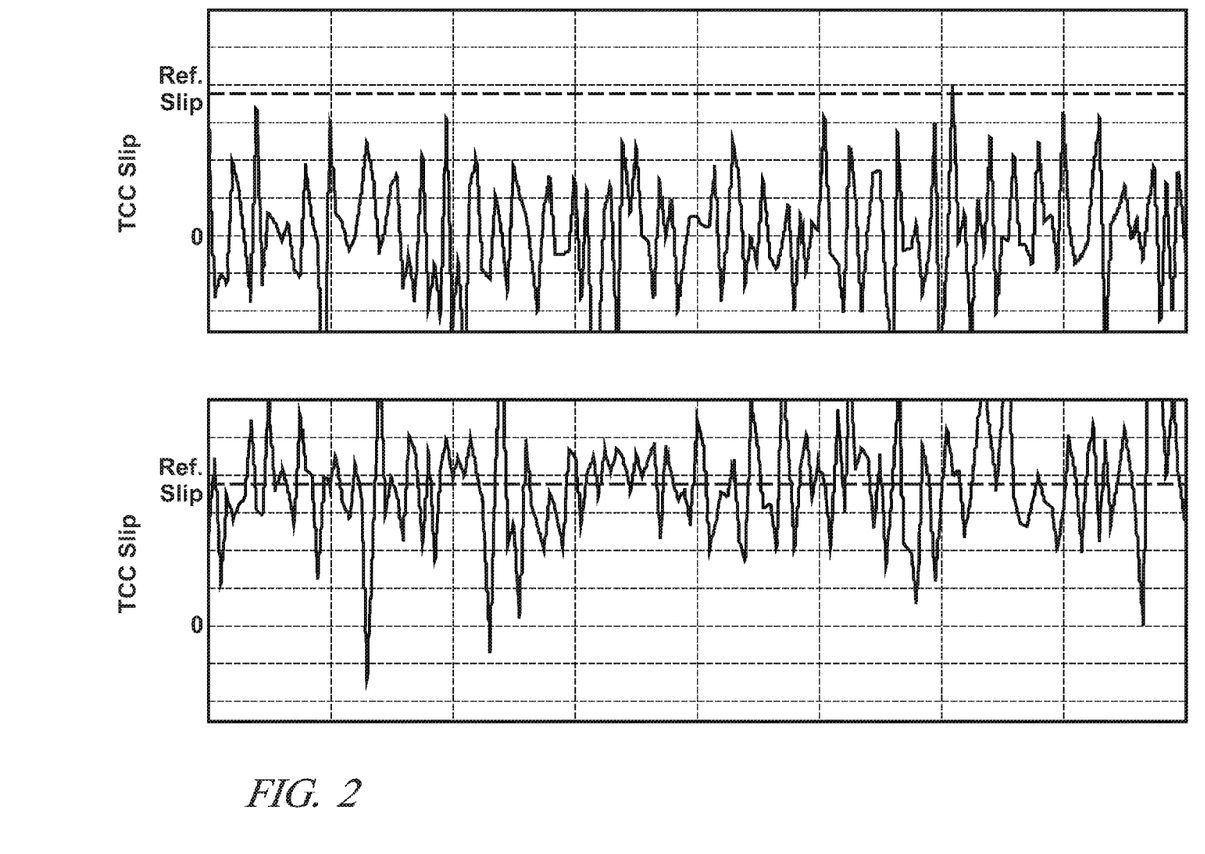
FIG. 2 depicts two sets of exemplary experimental data showing measured slip in a torque converter useful to determine standard deviation terms for each of the signals, in accordance with the present disclosure.

The probability equations described above, Equations 2 and 3, utilize standard deviation terms. FIG. 2 depicts two sets of exemplary experimental data showing measured slip in a TCC useful to determine standard deviation terms for each of the signals, in accordance with the present disclosure. The top graph of FIG. 2 depicts slip data measured from a torque converter with zero actual slip. The bottom graph of FIG. 2 depicts slip data measured from a torque converter operating a non-zero value describing a torque converter in a normal slipping condition.

The ratio of Equation 4 can be utilized directly to describe a likely condition of the torque converter or the corresponding TCC. However, variation in the probability terms of the ratio will create a change in the likelihood ratio proportional to the changes in the probability terms. Mathematical operations to improve resolution in a signal output are known. For example, one having ordinary skill in the art will appreciate that utilizing a base 10 logarithmic operation upon a value centering on a value of one can be utilized to transform the value depending upon whether the value is above or below one. The sign of the resulting value changes depending upon whether the input is above or below one. The logarithmic function is used is to simplify the mathematical expression and facilitate the calculation of the ratio. The logarithmic function is used because it is a monotonically increasing function preserving the information found in Equation 4. As a result, an expression log $\Lambda_k$ ($y_k$) can be utilized to return an exponentially increasingly negative value as the ratio value varies from one toward zero. In this way, as the probability of a crashed condition in the clutch increases, the resulting signal resulting from the logarithmic operation returns a significantly decreasing value.

The methods described above to statistically determine a condition of the clutch can be used in single measurements. However, the variables utilized to determine the probabilities in the ratio are subject to signal noise. As a result, individual measurements can be unreliable in order to indicate and react to a locked clutch condition. Instead, the probabilities at each time sample, k, can be combined to filter or minimize the effects of noise over a period of sample values. One exemplary form of such an operation can be expressed by the following equation.

$$\text{Test Statistic} = \left(\sum_{i=1}^{k-1} \log \Lambda_i(y_i)\right) + \log \Lambda_k(y_k) \quad [5]$$

One to k represents a summing sample period through which values are collected into a series to be summed for the test statistic. Through this equation, assuming the sample of values from one to k to be sufficiently large, the effects of signal noise in the signal are minimized. A small number of values indicating a crashed condition caused by noise in the monitored data will not indicate a crashed condition, but repeated values indicating a crashed condition will affect the test statistic to describe a crashed condition. However, one having skill in the art will appreciate that the sample of values from one to k must also not be too large, as the resulting test statistic must relatively quickly respond to repeated negative values to indicate the crashed condition in a timely manner.

Figure 3:
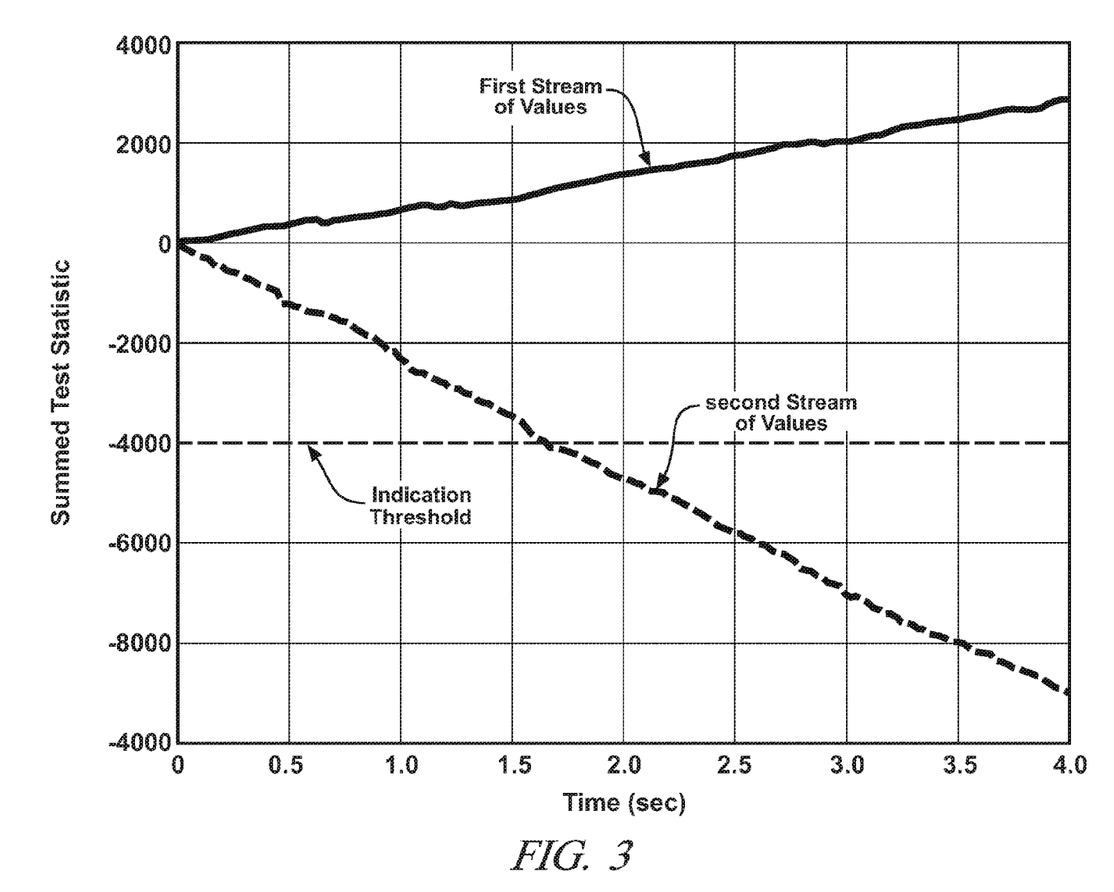
FIG. 3 graphically depicts exemplary summing of test statistic values, useful to indicate a condition of a torque converter, in accordance with the present disclosure.

Tracking a series of values of the above described ratio or a test statistic manipulating the values of the above ratio indicating a crashed condition in the torque converter can be accomplished by a number of methods known in the art. For example, values of the ratio or values of the exemplary test statistic can be analyzed through further statistical methods known in the art to determine an occurrence and magnitude of the negative values generated. Another exemplary method is to sum test statistic values and compare the sum to a threshold value indicating a sufficiently negative sum to indicate a crashed condition in the clutch. FIG. 3 graphically depicts exemplary summing of test statistic values, useful to indicate a condition of a torque converter, in accordance with the present disclosure. The depicted test statistic values are results from the exemplary method described above and embodied in Equations 2-5. However, as described above, different methods and mathematical operations can be employed to equally useful result, and the disclosure is not intended to be limited to the embodiment depicted in FIG. 3. Two exemplary streams of test statistic values are depicted. A first stream of values starts at zero and increases in value. As described above, positive values indicate a TCC more likely to be slipping than in a locked condition, and an upwardly sloping line is consistent with a system more likely to include a slipping TCC than a locked TCC. A second stream of values starts at zero and decreases in value. As described above, negative values indicate a TCC more likely to be in a locked condition. The accumulation of negative values resulting in a downwardly sloping line is consistent with a system more likely to include a locked TCC than a slipping TCC. The exemplary method depicted in FIG. 3 utilizes an indication threshold to determine what accumulation of negative test statistic values is sufficient to indicate that the torque converter is in a crashed condition. Other exemplary methods are envisioned, for example, based upon a negative slope or a negative rate of change of the resulting accumulation substantially being maintained a minimum time period. As described above, the slip signal used to indicate a crashed condition is noisy, and any method analyzing the slope of a resulting test statistic should include tolerance for minor deviations in the slope of the line, with minor inflections not affecting an overall indication of a crashed condition. In the exemplary analysis depicted, an accumulated decision variable or summation of test statistic values as an indication threshold is selected at −4000. As the summation of test statistic values meets and goes below −4000, a torque converter in a likely crashed condition can be indicated.

One having skill in the art will appreciate that the accumulation of test statistic values depicted in FIG. 3 must be reset occasionally, or accumulation of positive values under normal slipping operation would be difficult to overcome in response to an acute crashing event of the torque converter. Such an accumulation can be overcome by considering a window of values through some fixed number of most recent samples. If the values in the window change from the beginning of the window to the end of the window by more than the threshold, then the threshold condition is indicated. Alternatively, the accumulation can be reset periodically based upon time. Alternatively, the accumulation can be reset in response to a perceived inversion of the accumulated points, such an inversion determinable by comparison of sequential values of the signal or by other methods known in the art. Further, one having ordinary skill in the art will appreciate that the accumulation method described above can be accomplished by plotting values, as is depicted in FIG. 3, or the method can be accomplished entirely as a mathematical function, for example, utilizing an inflection point in test statistic values to zero an accumulated term and utilizing the indication threshold to examine summed values of the accumulated term from the inflection point.

The methods described above indicate a TCC with zero slip or a corresponding crashed condition in the torque converter. Indication of the crashed condition can be used to react to the undesirable crashed condition. For example, it will be appreciated that control of the TCC can be modulated to increase an amount of slip allowed in the torque converter. For example, in the exemplary clutch configuration described above wherein a pressure command to the clutch is utilized to modulate slip within the torque converter, a predetermined drop to the pressure command can be utilized to recover or increase slip from the crashed condition. The predetermined drop may be developed experimentally, empirically, predictively, through modeling or other techniques adequate to accurately predict operation of the torque converter, and a plurality of predetermined drops can be utilized depending upon engine speed, vehicle speed, transmission gear, the magnitude of slip being controlled in the torque converter, or other factors affecting operation of the torque converter and the occurrence of crash conditions therein. A single drop in pressure command can be utilized to react to a crashed condition in the torque converter. In the alternative, an initial drop in pressure command can be utilized, and, in combination with continued monitoring of the crashed condition according to methods described herein, a subsequent series of drops can be commanded until the monitoring indicates that the crashed condition has been resolved. In the alternative, instead of a step drop or a series of step drops in pressure command, a pressure drop profile can be utilized. For example, upon indication of crashed condition, a controlled drop in pressure command can be generated until continued monitoring of the clutch indicates that the crashed condition has been resolved. Many embodiments of reactions to the indication of the crashed condition are envisioned, and the disclosure is not intended to be limited to the particular exemplary embodiments described herein.

Figure 4:
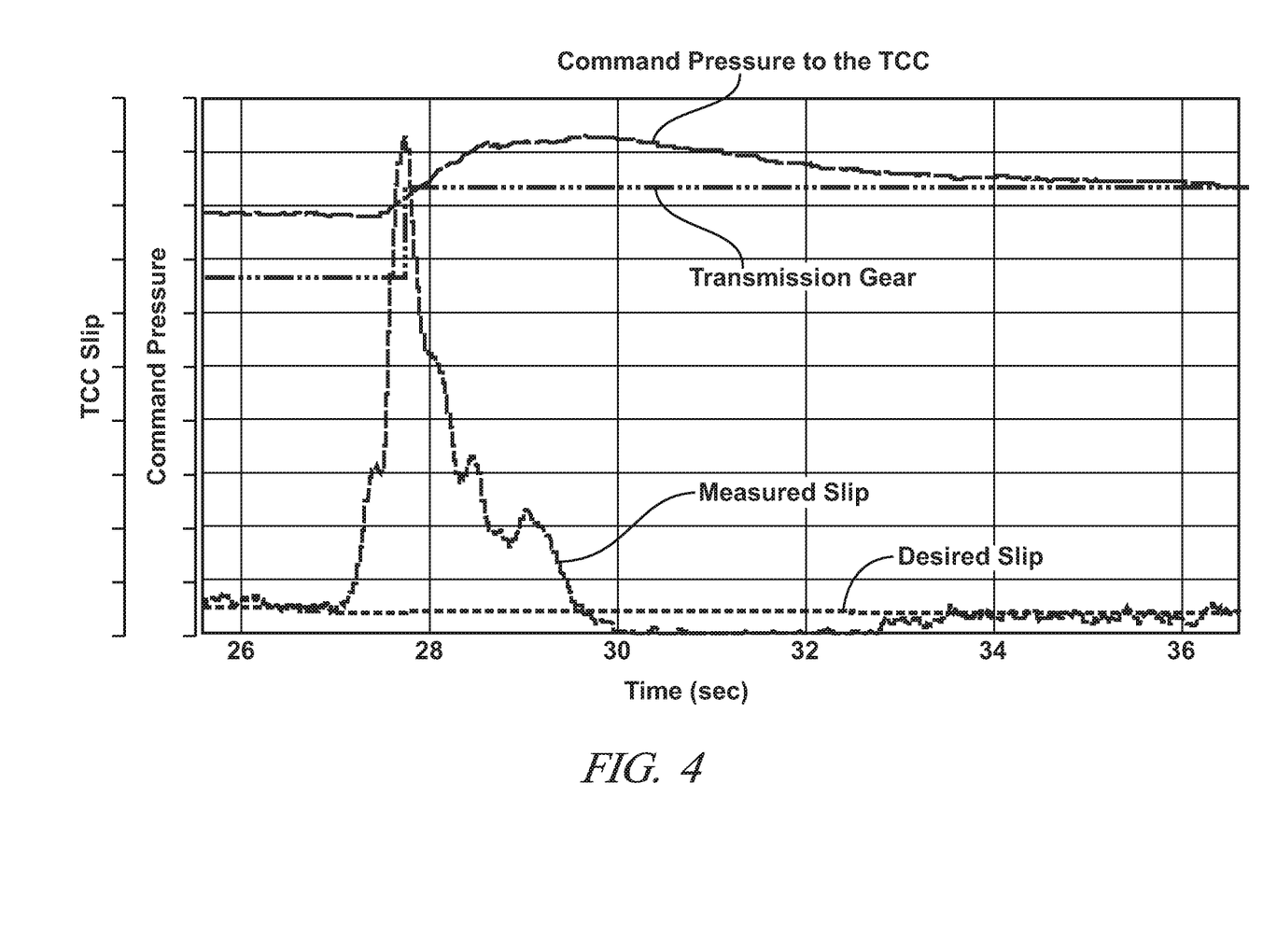
FIG. 4 graphically depicts an exemplary crashed condition in a torque converter, in accordance with the present disclosure.

FIG. 4 graphically depicts an exemplary crashed condition in a torque converter, in accordance with the present disclosure. Slip is depicted in a torque converter through a period of time. Something occurs, for example, a tip in event whereby the engine torque increases dramatically or, as depicted in FIG. 4, a change in output torque experienced through a transmission gear change, to cause the slip to rapidly increase. As described above, control systems utilize methods such as feedback and feed forward control to rapidly regain control of the slip back to within acceptable ranges. TCC pressure is depicted, illustrating an increase in pressure command to the clutch corresponding to a method to control the depicted increase in clutch slip. The control method is effective to quickly reduce slip, and the slip quickly returns to a range of slip exhibited before the initiation of the slip increase. However, the reduction in slip fails to stop before the slip reduces to zero, and a crashed condition results. After some time, as the TCC pressure recovers to normal levels, slip increases back to the range exhibited before the initiation of the slip increase. As described above, the crash that results in FIG. 4 can be undesirable, with the operator of the powertrain experiencing corresponding adverse effects to drivability.

Figure 5:
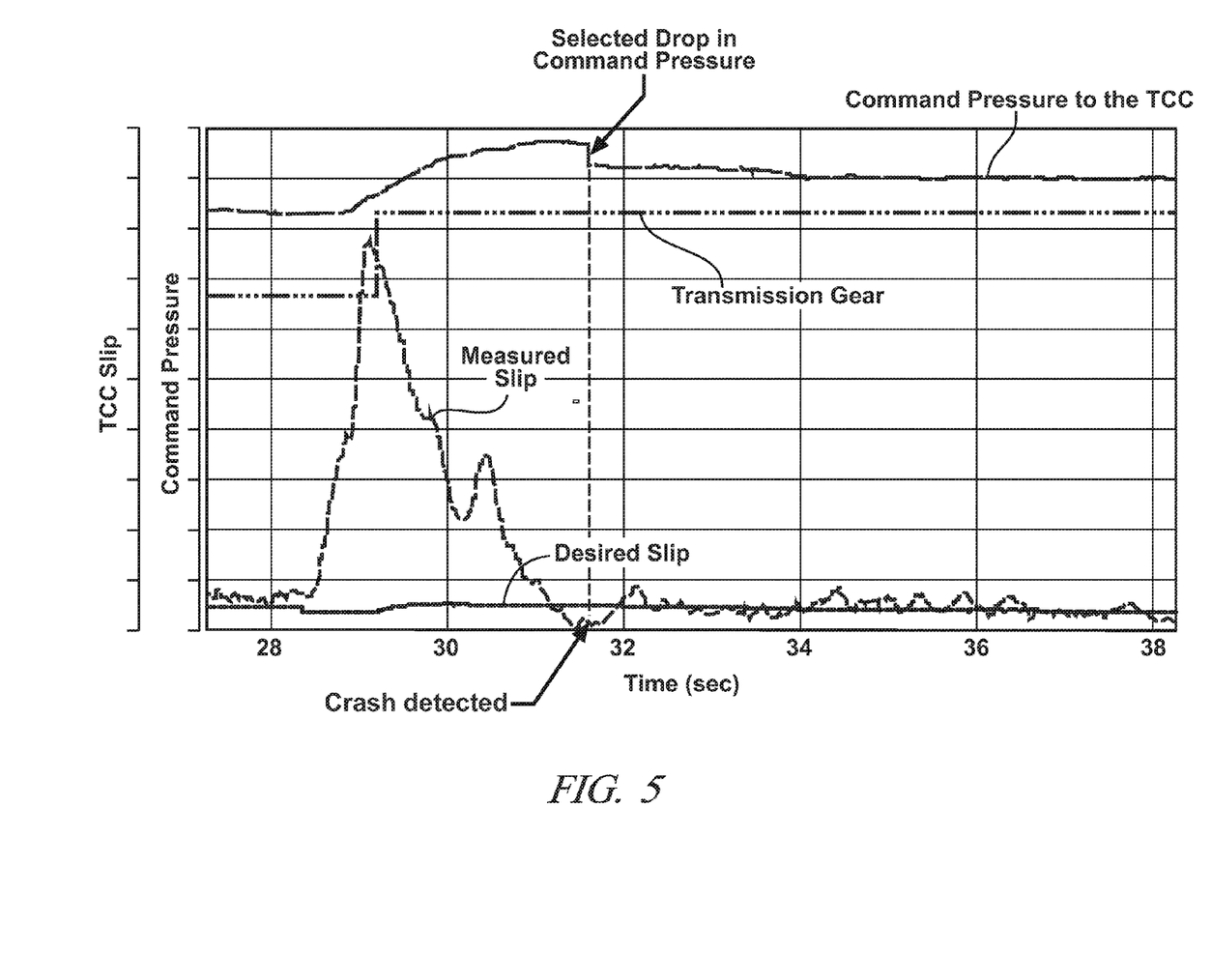
FIG. 5 graphically depicts an exemplary crashed condition in a torque converter, including a reaction to the indicated crashed condition wherein a drop to a pressure command is utilized to increase slip, in accordance with the present disclosure.

FIG. 5 graphically depicts an exemplary crashed condition in a torque converter, including a reaction to the indicated crashed condition wherein a drop to a pressure command is utilized to increase slip, in accordance with the present disclosure. FIG. 5 depicts a similar event as FIG. 4, with a similar dramatic increase in slip depicted corresponding to a shift in transmission gear. As in FIG. 4, pressure commanded to the TCC in FIG. 5 increases, and as a result, slip is quickly reduced back into the range of slip exhibited before the initial increase in slip. The slip depicted in FIG. 5 overshoots the range exhibited before the initial increase in slip. However, according to methods described herein, the resulting crashed condition is indicated as the slip reaches substantially zero. Based upon the indicated crashed condition, the pressure commanded to the clutch is reduced by a predetermined pressure drop. Referencing the slip immediately following the drop in pressure commanded to the clutch, the slip quickly increases back to the range exhibited before the initial increase in slip. In this way, methods described herein to statistically indicate a crashed condition can be utilized to quickly recover from the crashed condition in a torque converter.

Figure 6:
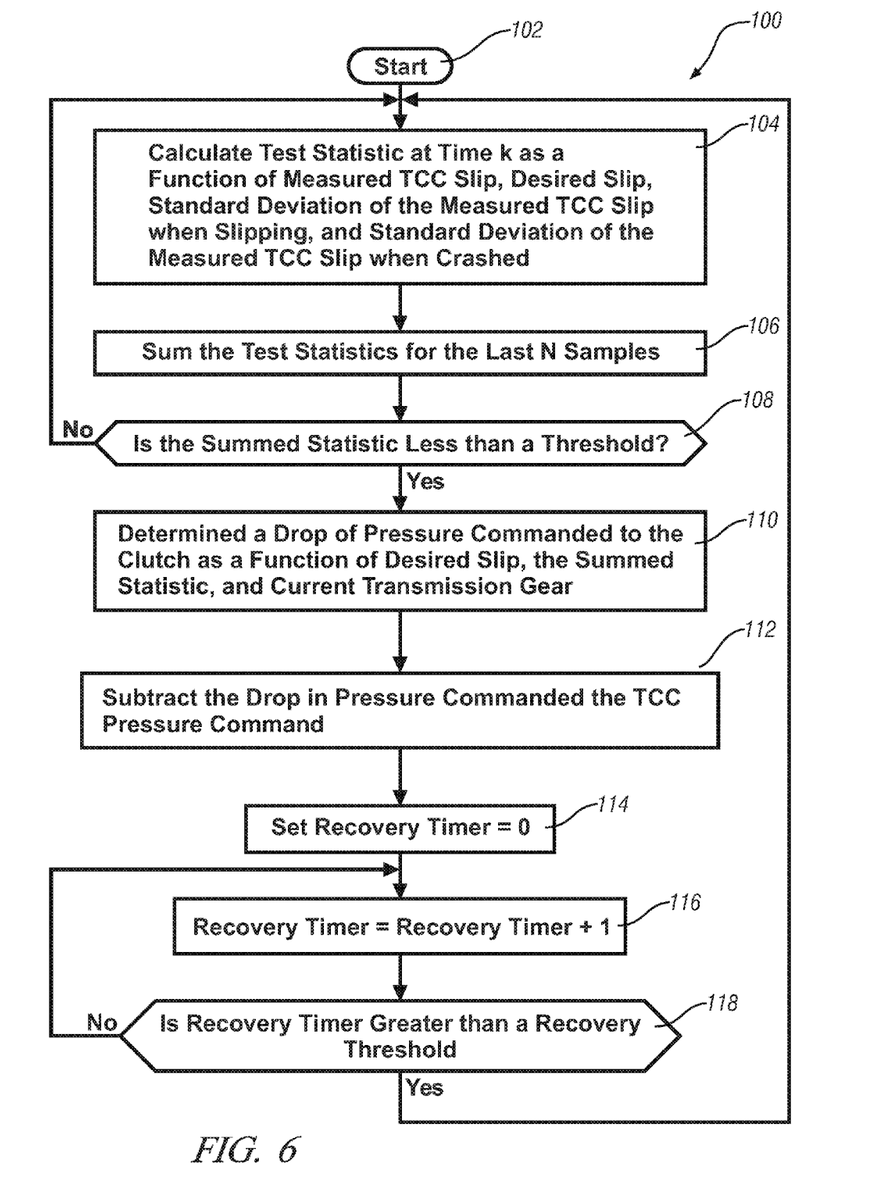
FIG. 6 schematically depicts an exemplary process whereby a method to statistically indicate a crashed condition can be accomplished, in accordance with the present disclosure.

FIG. 6 schematically depicts an exemplary process whereby a method to statistically indicate a crashed condition can be accomplished, in accordance with the present disclosure. Process 100 is depicted and starts with block 102. At block 104, a test statistic is determined according to methods described herein based upon a measured TCC slip, a desired slip, a standard deviation of the TCC slip when the torque converter is slipping, and a standard deviation of the TCC slip when the torque converter is crashed. At block 106, test statistics for the last N number of samples, if available, are summed. This sum of test statistics, as described above, is useful to determine whether the torque converter is more likely to be in a crashed condition or slipping. At block 108, this sum from block 106 is compared to a threshold selected to indicate a crashed condition. If the sum is less than the threshold, then a crashed condition is indicated and the process advances to block 110. If the sum is not less than the threshold, then a crashed condition is not indicated, and the process returns to block 104. At block 110, a drop of pressure commanded to the TCC is determined based upon a number of variables affecting how much of a drop is required to controllably increase slip in the torque converter. In this exemplary embodiment, the variables affecting selection of the drop include the desired slip, the sum of the test statistics, and the current transmission gear. At block 112, the predetermined drop is subtracted from the pressure commanded to the TCC in order to increase slip according to methods described herein. Blocks 114 through 118 utilize a recovery timer to maintain control of the pressure commanded to the TCC for a calibrated time selected to allow the slip to return to a range based upon the desired slip.

As mentioned above, it will be appreciated that Equations 2 and 3 describe a specific set of reference slip speeds including a zero slip speed indicating a crashed condition and a non-zero slip speed indicating normal operation of the torque converter in a controlled slip mode. Such a non-zero slip speed indicating normal operation of the torque converter will be different for different particular torque converters and can be selected according to methods known in the art. As described above, occurrence of a crashed condition is frequently undesirable, creating adverse effects to drivability. In one embodiment, a non-zero low slip threshold can be selected to indicate a threshold low slip condition, which when indicated can be used to control increased slip in order to avoid a potential crash condition. This low slip threshold is selected to adequately predict impending crash conditions without indicating excessive false indications and may be developed experimentally, empirically, predictively, through modeling or other techniques adequate to accurately predict torque converter operation, and a multitude of thresholds might be used by the same powertrain depending upon engine speed, vehicle speed, transmission gear, the magnitude of slip being controlled in the torque converter, or other factors affecting operation of the torque converter and the occurrence of crash conditions therein. Based upon this low slip threshold, methods employed above, for example, utilizing iterative sums of the ratio described above, can be used to initiate commands to avoid the crash condition, for example, by commanding a step decrease to pressure commands to the TCC. Utilizing a reference slip of zero or a low value selected as a low slip threshold, statistical analysis of the clutch can be performed to diagnose the condition of the TCC and generate commands to recover from or avoid a crash condition.

Further, the methods described herein discuss an embodiment controlling slip if the statistical analysis describes the slip as being close to or at a crash condition. It will be appreciated that similar methods can be employed to determine a likely threshold high slip condition, comparing versions of Equations 2 and 3 based upon a reference slip speed normal operation of the torque converter in a controlled slip mode and a threshold high slip speed to determine occurrence of a threshold high slip condition. Such a threshold high slip speed can be selected to describe a condition of unacceptably high slip according to methods similar to those described above for selecting the low slip threshold. Statistical analysis of the slip speed can simultaneously be operated for identification of a threshold low slip speed and a threshold high slip speed, and the slip speed can be controlled according to whether either threshold is likely violated. In an alternative method, the summed value described in FIG. 3 could be compared to positive and negative thresholds, indicated for threshold high slip and low slip conditions according to the method described above.

Figure 7A:
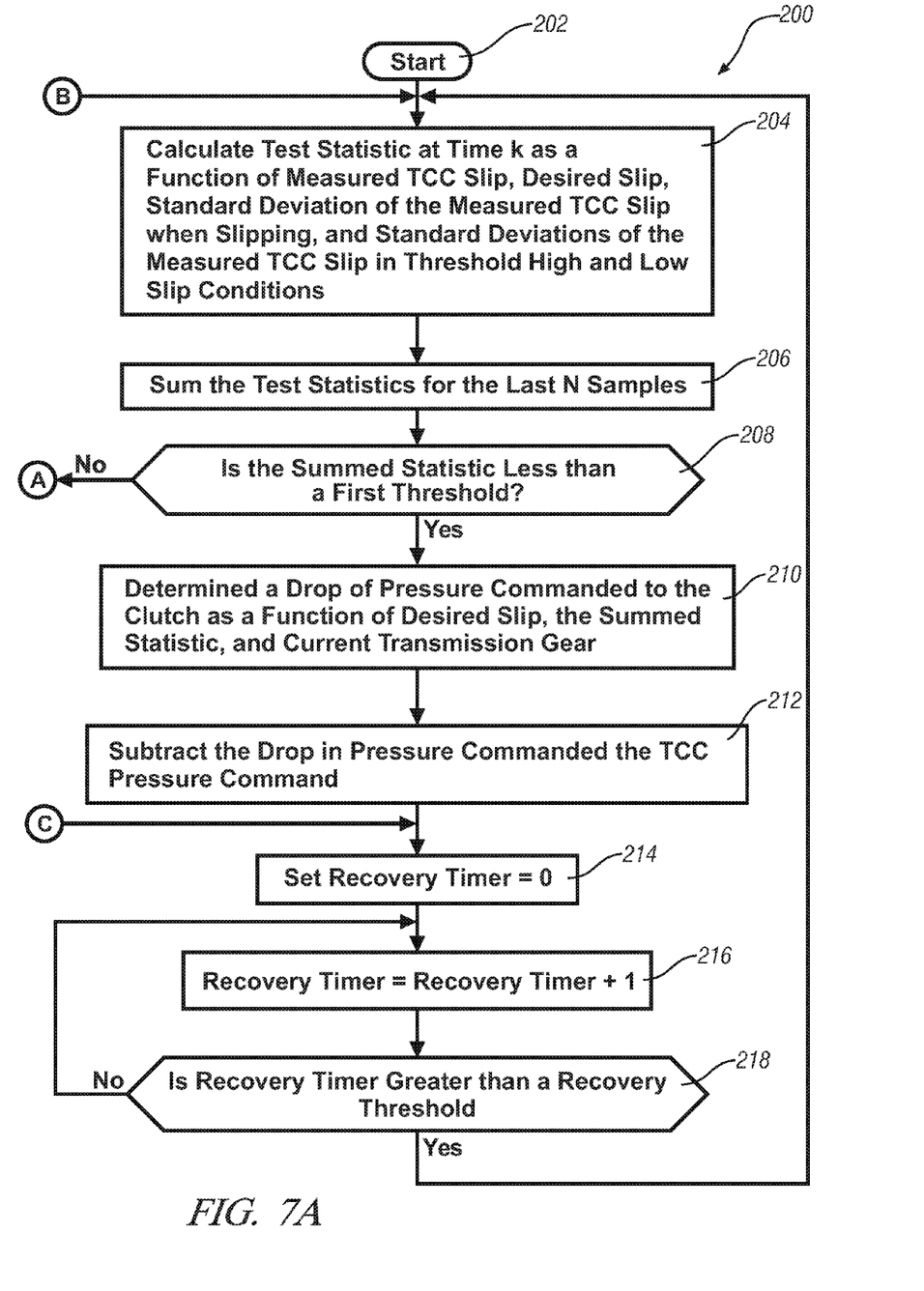
FIGS. 7A and 7B schematically depict an exemplary process whereby a method to statistically indicate a threshold high slip condition or threshold low slip condition can be accomplished, in accordance with the present disclosure.
Figure 7B:
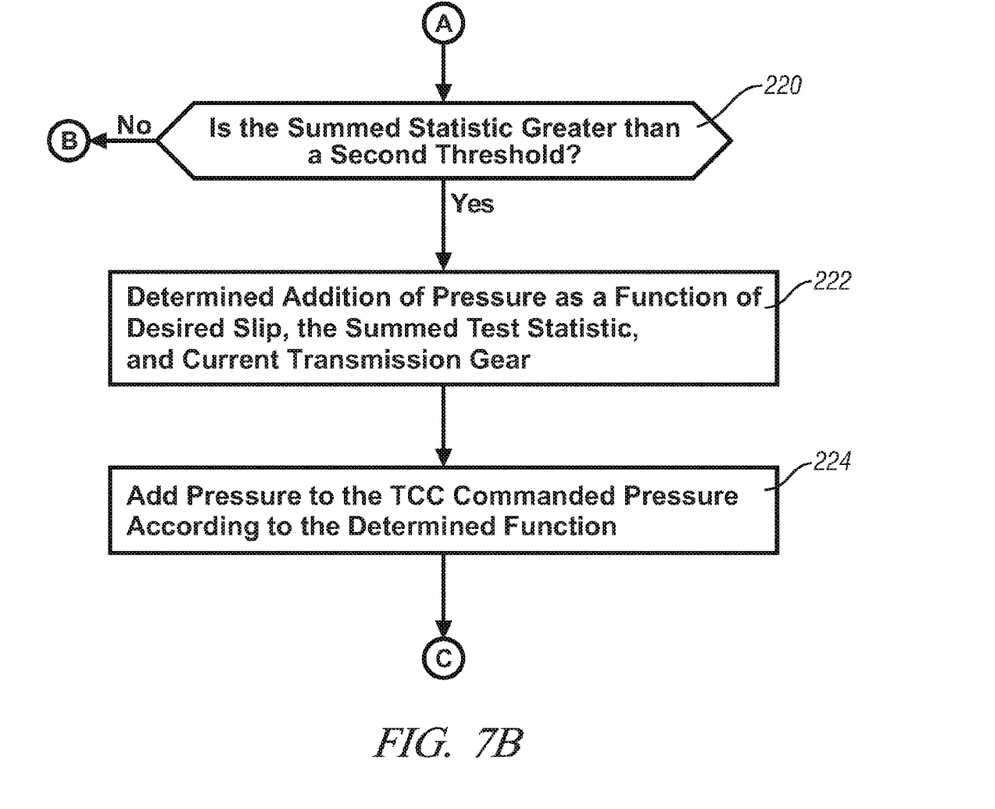

An exemplary process is disclosed to indicate either a threshold high slip condition or threshold low slip condition. FIGS. 7A and 7B schematically depict an exemplary process whereby a method to statistically indicate a threshold high slip condition or threshold low slip condition can be accomplished, in accordance with the present disclosure. Process 200 is depicted and starts with block 202. At block 204, a test statistic is determined according to methods described herein based upon a measured TCC slip, a desired slip, a standard deviation of the TCC slip when the torque converter is slipping, a standard deviation of the TCC slip when the torque converter is below a threshold low slip condition, and a standard deviation of the TCC slip when the torque converter is above a threshold low slip condition. At block 206, test statistics for the last N number of samples, if available, are summed. This sum of test statistics, as described above, is useful to determine whether the torque converter is more likely to be in one of the threshhold conditions. At block 208, this sum from block 206 is compared to a first threshold selected to indicate a threshold low slip condition. If the sum is less than the threshold, then a threshold low slip condition is indicated and the process advances to block 210. If the sum is not less than the threshold, then a threshold low slip condition is not indicated, and the process advances to block 220. At block 210, a drop of pressure commanded to the TCC is determined based upon a number of variables affecting how much of a drop is required to controllably increase slip in the torque converter. In this exemplary embodiment, the variables affecting selection of the drop include the desired slip, the sum of the test statistics, and the current transmission gear. At block 212, the predetermined drop is subtracted from the pressure commanded to the TCC in order to increase slip according to methods described herein, and the process advances to block 214. At block 220, the sum from block 206 is compared to a second threshold selected to indicate a threshold high slip condition. If the sum is greater than the threshold, then a threshold high slip condition is indicated and the process advances to block 222. If the sum is not less than the threshold, then a threshold low slip condition is not indicated, and the process returns to block 204. At block 222, an increase in pressure commanded to the TCC is determined based upon a number of variables affecting how much of a drop is required to controllably decrease slip in the torque converter. In this exemplary embodiment, the variables affecting selection of the increase include the desired slip, the sum of the test statistics, and the current transmission gear. At block 224, the predetermined increase is added to the pressure commanded to the TCC in order to decrease slip according to methods described herein, and the process advances to block 214. Blocks 214 through 218 utilize a recovery timer to maintain control of the pressure commanded to the TCC for a calibrated time selected to allow the slip to return to a range based upon the desired slip.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling torque converter slip in a powertrain comprising an engine, a transmission, and a torque converter located between the engine and the transmission, the method comprising:
monitoring slip in the torque converter;
in response to an unintended rapid increase in slip from a desired non-zero slip speed while operating the torque converter in a controlled slip mode, increasing command pressure of a torque converter clutch of the torque converter to reduce the slip back to the desired non-zero slip speed;
statistically analyzing the monitored slip to determine a likely condition of the torque converter; and
utilizing the likely condition of the torque converter to control the torque converter slip comprising modulating a command pressure of a torque converter clutch of the torque converter to one of recover from a crashed condition or avoid the crashed condition, the crashed condition corresponding to a zero slip speed.

2. The method of claim 1, wherein statistically analyzing the monitored slip to determine the likely condition of the torque converter comprises determining a locked condition of the torque converter clutch of the torque converter.

3. The method of claim 2, wherein determining the locked condition of torque converter clutch of the torque converter comprises determining a first probability that the slip in the torque converter is zero.

4. Method for controlling torque converter slip in a powertrain comprising an engine, a transmission, and a torque converter located between the engine and the transmission, the method comprising:
operating the torque converter in a controlled slip mode;
monitoring slip in the torque converter;
determining a first probability that the slip in the torque converter is zero;
determining a second probability that the slip in the torque converter is not zero;
comparing the first and second probabilities;
determining a locked condition of a torque converter clutch based upon comparing the first and second probabilities;
statistically analyzing the monitored slip to determine a likely condition of the torque converter, the likely condition determined when the locked condition of the torque converter clutch of the torque converter is determined; and
utilizing the likely condition of the torque converter to control the torque converter slip comprising modulating a command pressure of the torque converter clutch of the torque converter to one of recover from a crashed condition or avoid the crashed condition.

5. The method of claim 1, wherein statistically analyzing the monitored slip to determine the likely condition of the torque converter comprises determining a low slip condition of the torque converter clutch of the torque converter.

6. The method of claim 5, wherein determining the low slip condition of the torque converter clutch of the torque converter comprises determining a first probability that the slip in the torque converter is less than a non-zero low slip threshold speed.

7. Method for controlling torque converter slip in a powertrain comprising an engine, a transmission, and a torque converter located between the engine and the transmission, the method comprising:
operating the torque converter in a controlled slip mode;
monitoring slip in the torque converter;
determining a first probability that the slip in the torque converter is less than a non-zero low slip threshold speed;
determining a second probability that the slip in the torque converter is a non-zero value describing the torque converter to be not locked;
comparing the first and second probabilities;
determining a low slip condition of a torque converter clutch based upon comparing the first and second probabilities;
statistically analyzing the monitored slip to determine a likely condition of the torque converter, the likely condition determined when the low slip condition of the torque converter clutch is determined; and
utilizing the likely condition of the torque converter to control the torque converter slip comprising modulating a command pressure of the torque converter clutch of the torque converter to one of recover from a crashed condition or avoid the crashed condition.

8. The method of claim 1, wherein the utilizing the likely condition of the torque converter to control the torque converter slip comprises commanding a drop to the command pressure of the torque converter clutch of the torque converter.

9. The method of claim 1, wherein statistically analyzing the monitored slip to determine the likely condition of the torque converter comprises determining a high slip condition of the torque converter clutch of the torque converter.

10. The method of claim 1, wherein statistically analyzing the monitored slip to determine the likely condition of the torque converter comprises determining a high slip condition of the torque converter clutch of the torque converter; and
wherein utilizing the likely condition of the torque converter to control the torque converter slip comprises commanding an increase to the command pressure of the torque converter clutch of the torque converter based upon the high slip condition.

11. The method of claim 10, wherein the utilizing statistical analysis of the monitored slip to determine the likely condition of the torque converter further comprises determining a low slip condition of the torque converter clutch of the torque converter; and
wherein the utilizing the determined likely condition of the torque converter to control the torque converter slip further comprises commanding a drop to the command pressure of the torque converter clutch of the torque converter based upon the low slip condition.

12. Method for controlling torque converter slip in a powertrain comprising an engine, a transmission, and a torque converter located between the engine and the transmission, the method comprising:
monitoring slip in the torque converter;
in response to an unintended rapid increase in slip from a desired non-zero slip speed while operating the torque converter in a controlled slip mode, increasing command pressure of a torque converter clutch of the torque converter to reduce the slip back to the desired non-zero slip speed;
statistically analyzing the monitored slip to determine an occurrence of a crashed condition in the torque converter; and
utilizing the occurrence of the crashed condition to control the torque converter slip comprising commanding a command pressure of a torque converter clutch of the torque converter to one of recover from the crashed condition or avoid the crashed condition, the crashed condition corresponding to a zero slip speed.

13. Method for controlling torque converter slip in a powertrain comprising an engine, a transmission, and a torque converter located between the engine and the transmission, the method comprising:
operating the torque converter in a controlled slip mode;
monitoring slip in the torque converter;
statistically analyzing the monitored slip to determine an occurrence of a crashed condition in the torque converter comprising:
determining a first probability that the torque converter is in the crashed condition;
determining a second probability that the torque converter is not in the crashed condition;
determining a ratio of the first and second probabilities;
determining the occurrence of the crashed condition based upon the ratio; and
utilizing the occurrence of the crashed condition to control the torque converter slip comprising commanding a command pressure of a torque converter clutch of the torque converter to one of recover from the crashed condition or avoid the crashed condition.

14. The method of claim 13, wherein determining the occurrence of the crashed condition based upon the ratio comprises determining the occurrence using iterative values of the ratio.

15. The method of claim 14, wherein determining the using iterative values of the ratio comprises:
calculating respective logarithms of the iterative values of the ratio;
summing the logarithms of the iterative values through a summing sample period; and
determining the occurrence of the crashed condition based upon the summing.

16. The method of claim 15, wherein determining the occurrence of the crashed condition based upon the summing comprises:
plotting iterative results of the summing; and
determining the occurrence of the crashed condition based upon the plotting.

17. The method of claim 16, wherein the plotting iterative results of the summing comprises:
comparing iterative results of the summing to determine an inflection in the iterative results; and
initiating the plotting of iterative results of the summing based upon the comparing determining an inflection indicating a possible crashed condition; and
determining the occurrence of the crashed condition based upon the iterative results of the summing exceeding an indication threshold describing the crashed condition.

18. The method of claim 16, wherein determining the occurrence of the crashed condition based upon the plotting comprises:
determining a rate of change of the iterative results of the summing; and
determining the occurrence of the crashed condition based upon the rate of change indicating a likely crashed condition through a minimum time period.

19. Method for controlling torque converter slip in a powertrain comprising an engine, a transmission, and a torque converter located between the engine and the transmission, the method comprising:
operating the torque converter in a controlled slip mode;
monitoring slip in the torque converter;
statistically analyzing the monitored slip to determine an occurrence of a crashed condition in the torque converter comprising:
determining a probability that the torque converter is in the crashed condition;
comparing the probability that the torque converter is in the crashed condition to a threshold probability; and
determining the occurrence of the crashed condition based upon the comparing; and
utilizing the occurrence of the crashed condition to control the torque converter slip comprising commanding a command pressure of a torque converter clutch of the torque converter to one of recover from the crashed condition or avoid the crashed condition.

* * * * *